United States Patent
Marin et al.

(10) Patent No.: US 10,212,598 B2
(45) Date of Patent: Feb. 19, 2019

(54) ACCESS POINT INFORMATION FOR WIRELESS ACCESS

(71) Applicant: Nokia Technologies Oy, Espoo (FI)

(72) Inventors: Janne Marin, Espoo (FI); Niko Kiukkonen, Veikkola (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 15/039,813

(22) PCT Filed: Dec. 4, 2013

(86) PCT No.: PCT/FI2013/051133
§ 371 (c)(1),
(2) Date: May 26, 2016

(87) PCT Pub. No.: WO2015/082753
PCT Pub. Date: Jun. 11, 2015

(65) Prior Publication Data
US 2016/0381559 A1     Dec. 29, 2016

(51) Int. Cl.
| | | |
|---|---|---|
| *H04W 12/08* | (2009.01) | |
| *H04W 48/20* | (2009.01) | |
| *H04W 48/16* | (2009.01) | |
| *H04L 9/08* | (2006.01) | |
| *H04L 29/06* | (2006.01) | |

(52) U.S. Cl.
CPC .......... *H04W 12/08* (2013.01); *H04L 9/083* (2013.01); *H04L 63/107* (2013.01); *H04W 48/16* (2013.01); *H04W 48/20* (2013.01)

(58) Field of Classification Search
CPC ................................... H04W 12/08
USPC ................................. 455/411–414
See application file for complete search history.

(56) References Cited

U.S. PATENT DOCUMENTS

| | | | |
|---|---|---|---|
| 7,336,670 B1 * | 2/2008 | Calhoun | H04L 63/10 370/252 |
| 8,254,882 B2 * | 8/2012 | Cam-Winget | H04W 12/08 455/410 |
| 8,528,051 B2 * | 9/2013 | Choi | H04L 63/101 726/3 |
| 2004/0103282 A1 | 5/2004 | Meier et al. | |

(Continued)

FOREIGN PATENT DOCUMENTS

| | | |
|---|---|---|
| CN | 102547703 A | 7/2012 |
| GB | 2 426 159 A | 11/2006 |

(Continued)

OTHER PUBLICATIONS

International Search Report and Written Opinion received for corresponding Patent Cooperation Treaty Application No. PCT/FI2013/051133, dated Aug. 14, 2014, 13 pages.

(Continued)

*Primary Examiner* — Michael T Vu
(74) *Attorney, Agent, or Firm* — Alston & Bird LLP

(57) ABSTRACT

An apparatus (121) including a connectivity management unit (350) configured to provide wireless network access; a local secure storage (330) configured to securely store access point information; and a processor (240) configured to control the local secure storage to selectively provide a subset of the access point information to the connectivity management unit of the apparatus.

17 Claims, 4 Drawing Sheets

(56) References Cited

U.S. PATENT DOCUMENTS

| | | | |
|---|---|---|---|
| 2006/0075075 A1* | 4/2006 | Malinen | H04M 1/72572 709/220 |
| 2006/0259782 A1 | 11/2006 | Wang et al. | |
| 2007/0103303 A1* | 5/2007 | Shoarinejad | G01S 19/05 340/572.1 |
| 2008/0060064 A1 | 3/2008 | Wynn et al. | |
| 2009/0224867 A1* | 9/2009 | O'Shaughnessy | H04M 1/72569 340/5.1 |
| 2011/0106930 A1 | 5/2011 | Lee et al. | |
| 2011/0159818 A1* | 6/2011 | Scherzer | H04W 48/14 455/67.11 |
| 2011/0191279 A1* | 8/2011 | Kim | G06F 15/16 706/46 |
| 2012/0159172 A1 | 6/2012 | Saxena et al. | |
| 2012/0222083 A1 | 8/2012 | Vaha-Sipila et al. | |
| 2012/0270521 A1 | 10/2012 | Lopez Garcia et al. | |
| 2013/0104214 A1 | 4/2013 | Beck et al. | |

FOREIGN PATENT DOCUMENTS

| | | |
|---|---|---|
| KR | 20120012908 | 2/2012 |
| KR | 20120117083 | 10/2012 |
| WO | WO 2004/112345 A1 | 12/2004 |
| WO | 2012091146 | 7/2012 |
| WO | WO 2012/155233 A1 | 11/2012 |

OTHER PUBLICATIONS

Extended European Search Report from European Patent Application No. 13898516.3 dated Jun. 1, 2017, 7 pages.

Instabridge [online] [retrieved Apr. 27, 2017]. Received from the Internet: <URL: https://instabridge.com/end/>. (2017) 7 pages.

Tath, E. I. et al., *Security Challenges of Location-Aware Mobile Business* (Research Paper) [online] [retrieved Apr. 26, 2017]. Retrieved from the Internet: <URL: http://th.informatik.unimannheim.de/people/tatli/pub/scolamb.pdf>. (2005) 10 pages.

Nicholson, A. J. et al., *Improved Access Point Selection*, MobiSys '06 (Jun. 2006) 233-245.

Office Action for European Patent Application No. 13 898 516.3 dated Feb. 14, 2018, 4 pages.

Office Action for Chinese Patent Application No. 201380081401.8 dated Sep. 6, 2018, 12 pages.

Office Action for European Patent Application No. 13898516.3 dated Oct. 5, 2018, 5 pages.

* cited by examiner

ACCESS POINT INFORMATION FOR WIRELESS ACCESS

RELATED APPLICATION

This application was originally filed as PCT Application No. PCT/FI2013/051133 filed Dec. 4, 2013.

TECHNICAL FIELD

The present application generally relates to wireless communications and to managing access point information for wireless access.

BACKGROUND

This section illustrates useful background information without admission of any technique described herein representative of the state of the art.

Access to a wireless communication network by a user device such as a mobile phone, tablet or other electronic communication device, typically requires appropriate access point information, such as one or more of the following: mac address, ssid, credentials, location of the access point.

SUMMARY

Various aspects of examples of the invention are set out in the claims.

According to a first example aspect of the present invention, there is provided an apparatus comprising
  a connectivity management unit configured to provide wireless network access;
  a local secure storage configured to securely store access point information; and
  a processor configured to control the local secure storage to selectively provide a subset of the access point information to the connectivity management unit of the apparatus.

In an embodiment the local secure storage is configured to store the access point information in encrypted form and the processor is configured to control the local secure storage to provide the subset of the access point information in unencrypted form to the connectivity management unit of the apparatus.

In an embodiment the processor is configured to control the local secure storage to provide the subset of the access point information to the connectivity management unit of the apparatus on the basis of connectivity requirements of the apparatus.

In an embodiment the processor is configured to control the local secure storage to provide the subset of the access point information to the connectivity management unit of the apparatus so that the connectivity management unit is provided with access point information that is needed in the connectivity management unit at each time.

In an embodiment the processor is configured to obtain contextual information relating to the apparatus; and to control the local secure storage to provide the subset of the access point information based on the obtained contextual information.

In an embodiment the processor is configured to receive from the connectivity management unit a request for certain access point information; and to control the local secure storage to provide to the connectivity management unit the requested access point information.

In an embodiment the access point information comprises at least one of the following: mac address, ssid, credentials, and location of the respective access point.

In an embodiment the contextual information comprises at least one of the following: date, time, location of the apparatus, and an anticipated location of the apparatus.

In an embodiment the local secure storage resides on a trusted platform.

In an embodiment the processor is configured to control the local secure storage to obtain access point information from a global access point information storage.

In an embodiment processor is configured to determine an anticipated regional location of the apparatus and to control the local secure storage to obtain from the global access point information storage regional access point information relating to the anticipated regional location of the apparatus.

In an embodiment said subset comprises access point information of one access point. In another embodiment said subset comprises access point information of at least one access point.

According to a second example aspect of the present invention, there is provided a method comprising:
  securely storing access point information in a local secure storage of an apparatus; and
  selectively providing a subset of the access point information to a connectivity management functionality of the apparatus.

In an embodiment the access point information is stored in encrypted form in the local secure storage of the apparatus and the subset of the access point information is provided in unencrypted form to the connectivity management unit of the apparatus.

In an embodiment the subset of the access point information is stored to the connectivity management unit of the apparatus on the basis of connectivity requirements of the apparatus.

In an embodiment the subset of the access point information is provided to the connectivity management unit of the apparatus so that the connectivity management unit is provided with access point information that is needed in the connectivity management unit at each time.

In an embodiment the method further comprises obtaining contextual information relating to the apparatus; and providing the subset of the access point information based on the obtained contextual information.

In an embodiment the method further comprises receiving a request for certain access point information; and providing to the connectivity management functionality the requested access point information.

According to a third example aspect of the present invention there is provided a computer program product comprising computer code for causing performing the method of the first example aspect, when executed by an apparatus. Additionally, in further examples, the computer program product comprises computer code for causing performing the method of one or more example embodiments of the invention, when executed by an apparatus.

According to a fourth example aspect of the invention there is provided a non-transitory memory medium comprising the computer program of the third example aspect of the invention.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The embodiments in the foregoing are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Figure 1:
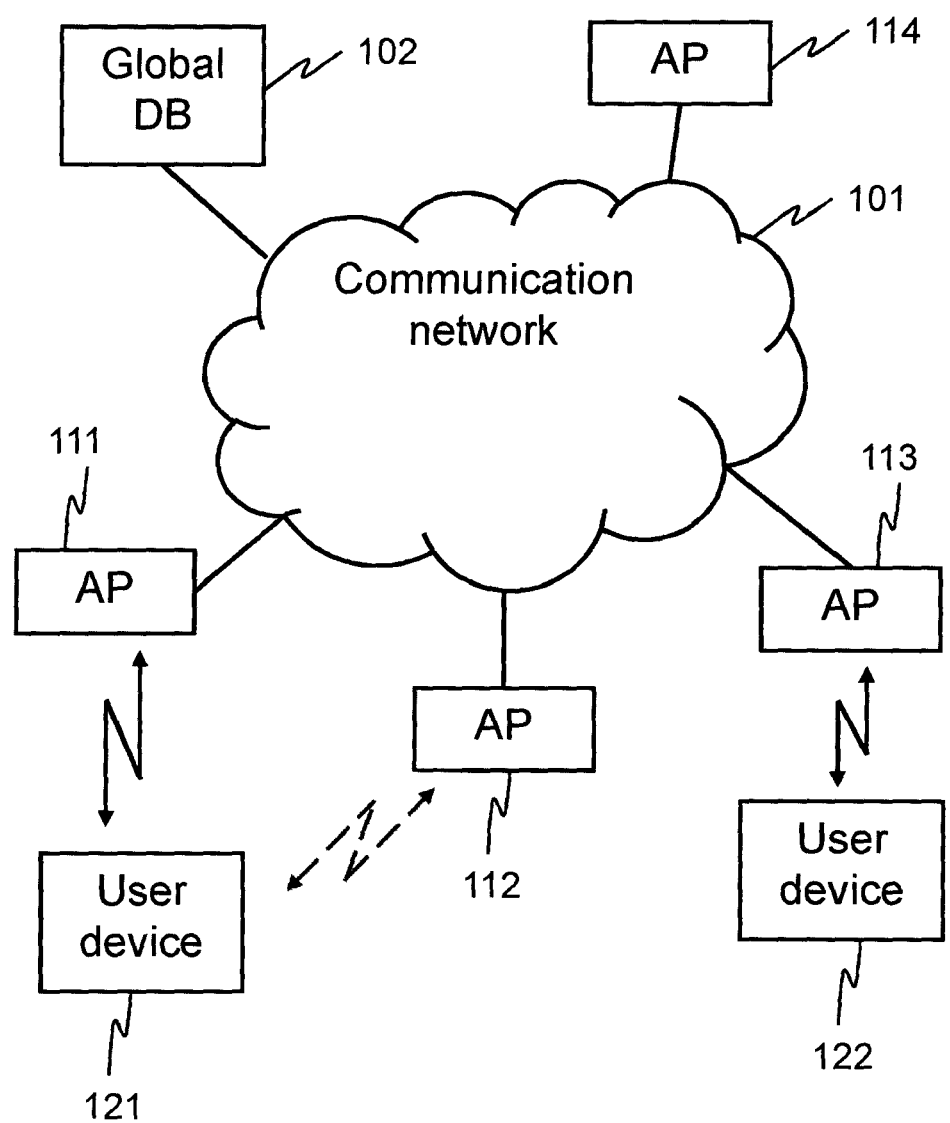
FIG. 1 shows an architectural overview of a system of an example embodiment of the invention.

An example embodiment of the present invention and its potential advantages are understood by referring to FIGS. 1 through 5 of the drawings. In this document, like reference signs denote like parts or steps.

User devices, such as mobile phones, tablets or other handheld devices provided with wireless communication functionality, can store access point information of a plurality of access points. An access point refers to a network element that to which user devices can connect to wirelessly and that provides access to one or more communication networks. If the user device comprises the access information of a certain access point, connecting to that access point can be performed automatically without user interaction. Storing a large amount of access point information in user devices may however be a security risk as the access point information in the user device can be vulnerable to attacks. Any process or application may be able to read the access point information stored in a user device and send the information to a third party. For example storing in a user device access point information relating to wireless access points (e.g. WLAN or WiFi access points) of a certain country might be seen as a security threat.

Storing a large amount of access point information in a user device causes also challenges relating to scalability. For example, if there are hundreds or even thousands of access points whose access point information is stored in a user device, the device is likely to have problems to go though all of those in an efficient and timely manner leading to situations where the device connection formation times to the wireless networks might be increased.

In an example embodiment there is provided a secured local database hidden in an application that handles the access point information in a user device. Information from the secured local database is written to the "outside" world only when needed (outside the secured local database). In an example embodiment the access point information is selectively provided from the local database to connectivity management based on certain criteria. In an example embodiment the access point information is provided from the local database to connectivity management based on connectivity requirements. For example, access point information of a certain access point is provided to connectivity management functionality of the user device only when the connectivity management functionality is forming a connection to the respective access point.

In an example embodiment the access point information is provided to connectivity management functionality of the user device based on context information relating to the user device. In this way there is provided an adaptive and contextual information flow between the secured local database and device's own connectivity management. Such solution does not necessarily require any changes in the connectivity management functionality of the device.

In various example embodiments WLAN or WiFi access points are used as an example. It is however understood that the embodiments are applicable to management of other connectivity or access point information as well. Other connectivity or access point information include but are not limited to connectivity or access point information relating to Bluetooth, Bluetooth Smart, WiMedia, ultra wide band (UWB), and Zigbee.

FIG. 1 shows an architectural overview of a system 100 of an example embodiment of the invention. The system 100 comprises a communication network 101, a global database 102, access points 111-114, and used devices 121 and 122.

The communication network 101 may be formed of a plurality of interconnected networks or other communication systems including for example one or more of wireless local area network, wired networks, cellular and satellite communication networks. The access points 111-114 are configured to provide wireless access to the communication network 101 (or to some part of the communication network 101). That is, the user devices 121-122 can access the communication network 101 through the access points 111-114.

For being able to connect to an access point, the user devices 121-122 need access point information of the particular access point they are connecting to including for example one or more of the following: mac address of the access point, ssid (service set identifier) of the access point, the security protocol that is used by the access point (e.g. wired equivalent privacy, WEP, or Wi-Fi protected access, WPA), credentials (e.g. password and/or encryption key), and location of the access point. The global database 102 comprises the access point information that enables the user devices 121-122 to connect to the access points 111-114 and therethrough to the communication network 101. The global database 102 is configured to directly or indirectly serve the access point information to the user devices 121-122 and/or the user devices 121-122 are configured to fetch the access point information from the global database 102. In an embodiment of the invention the user devices 121-122 are configured to fetch certain subset of all available access point information from the global database on the basis of certain criteria. In an example the user devices 121-122 are configured to fetch access point information concerning certain geographical area, such as continent, country, county, or city. In an example embodiment, the user devices 121-122 comprise a secured local database for storing the access point information obtained from the global database 102.

FIG. 1 shows an example where user device 121 is initially connected to access point 111 (shown with a solid line arrow) and e.g. due to the user device 121 moving to another location there is a need to connect to access point 112 (shown with a dashed line arrow). For this purpose the user device 121 needs access point information of the access point 112. In an example embodiment, the user device 121 comprises the access point information of the access point 112 in a local secure storage and the access point information is provided from the secured local secure storage to connectivity manager functionality in the user device 121 when the user device 121 needs to connect to the access point 112 or when it becomes possible for the user device 121 to connect to the access point 112.

For the sake of clarity only limited number of user devices and access points are shown in FIG. 1 and that in practice there may exist plurality of global databases as well (e.g. databases of different service providers or different network operators).

Figure 2:
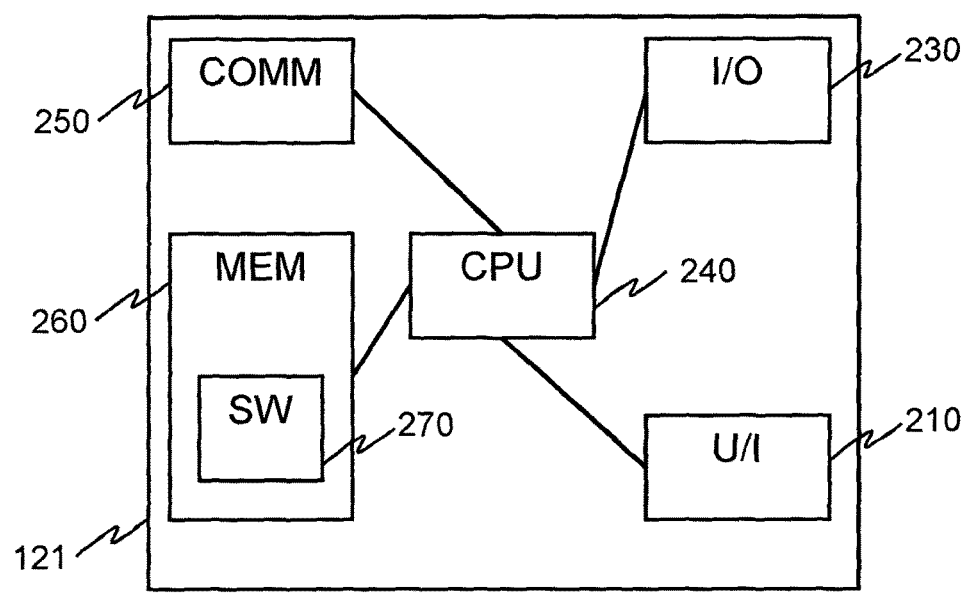
FIG. 2 shows a block diagram of an apparatus according to an example embodiment of the invention.

FIG. 2 shows a block diagram of an apparatus according to an example embodiment of the invention. The apparatus can be for example the user device 121 of FIG. 1. The apparatus 121 comprises a communication interface module 250, a processor 240 coupled to the communication interface module 250, and a memory 260 coupled to the processor 240. The apparatus further comprises an input/output (I/O) unit 230, and a user interface (U/I) unit 110, such as a touch sensitive display, which are coupled to the processor 240.

It shall be understood that any coupling in this document refers to functional or operational coupling; there may be intervening components or circuitries in between coupled elements unless expressly otherwise described.

The memory 260 comprises a work memory and a non-volatile memory such as a read-only memory, flash memory, optical or magnetic memory. In the memory 260, typically at least initially in the non-volatile memory, there is stored software 270 operable to be loaded into and executed by the processor 240. The software 270 may comprise one or more software modules and can be in the form of a computer program product that is software stored in a memory medium. In the context of this document, a "memory medium" may be any non-transitory media or means that can contain, store, communicate, propagate or transport the instructions for use by or in connection with an instruction execution system, apparatus, or device, such as a computer.

The communication interface module 250 is configured to provide local communications over one or more local links. The links may be wired and/or wireless links. The communication interface 250 may further or alternatively implement telecommunication links suited for establishing links with other users or for data transfer, e.g. using the Internet. Such telecommunication links may be links using any of: wireless local area network links, Bluetooth, ultra-wideband, cellular or satellite communication links. The communication interface 250 may be integrated into the apparatus 100 or into an adapter or card that may be inserted into a suitable slot or port of the apparatus 100. While FIG. 2 shows one communication interface 250, the apparatus may comprise a plurality of communication interfaces 250. In a further example embodiment, the apparatus 100 further comprises a near field communication (NFC) unit.

The processor 240 is, for instance, a central processing unit (CPU), a microprocessor, a digital signal processor (DSP), a graphics processing unit, an application specific integrated circuit (ASIC), a field programmable gate array, a microcontroller or a combination of such elements. FIG. 2 shows one processor 240, but the apparatus 121 may comprise a plurality of processors.

As mentioned in the foregoing, the memory 260 may comprise volatile and a non-volatile memory, such as a read-only memory (ROM), a programmable read-only memory (PROM), erasable programmable read-only memory (EPROM), a random-access memory (RAM), a flash memory, a data disk, an optical storage, a magnetic storage or a smart card. In some example embodiments, only volatile or non-volatile memory is present in the apparatus 100. Moreover, in some example embodiments, the apparatus comprises a plurality of memories. In some example embodiments, various elements are integrated. For instance, the memory 260 can be constructed as a part of the apparatus 121 or inserted for example into a slot or a port. Further still, the memory 260 may serve the sole purpose of storing data, or it may be constructed as a part of an apparatus serving other purposes, such as processing data. Similar options are thinkable also for various other elements.

A skilled person appreciates that in addition to the elements shown in FIG. 2, the apparatus 121 may comprise other elements, such as microphones, displays, as well as additional circuitry such as a camera unit, further input/output (I/O) circuitries, memory chips, application-specific integrated circuits (ASIC), processing circuitry for specific purposes such as source coding/decoding circuitry, channel coding/decoding circuitry and ciphering/deciphering circuitry. Additionally, the apparatus 121 may comprise a disposable or rechargeable battery (not shown) for powering the apparatus if external power supply is not available.

It is also useful to realize that the term apparatus is used in this document with varying scope. In some of the broader claims and examples, the apparatus may refer to only a subset of the features presented in FIG. 2 or even be implemented without any one of the features of FIG. 2. In an example embodiment term apparatus refers to the processor 240.

Figure 3:
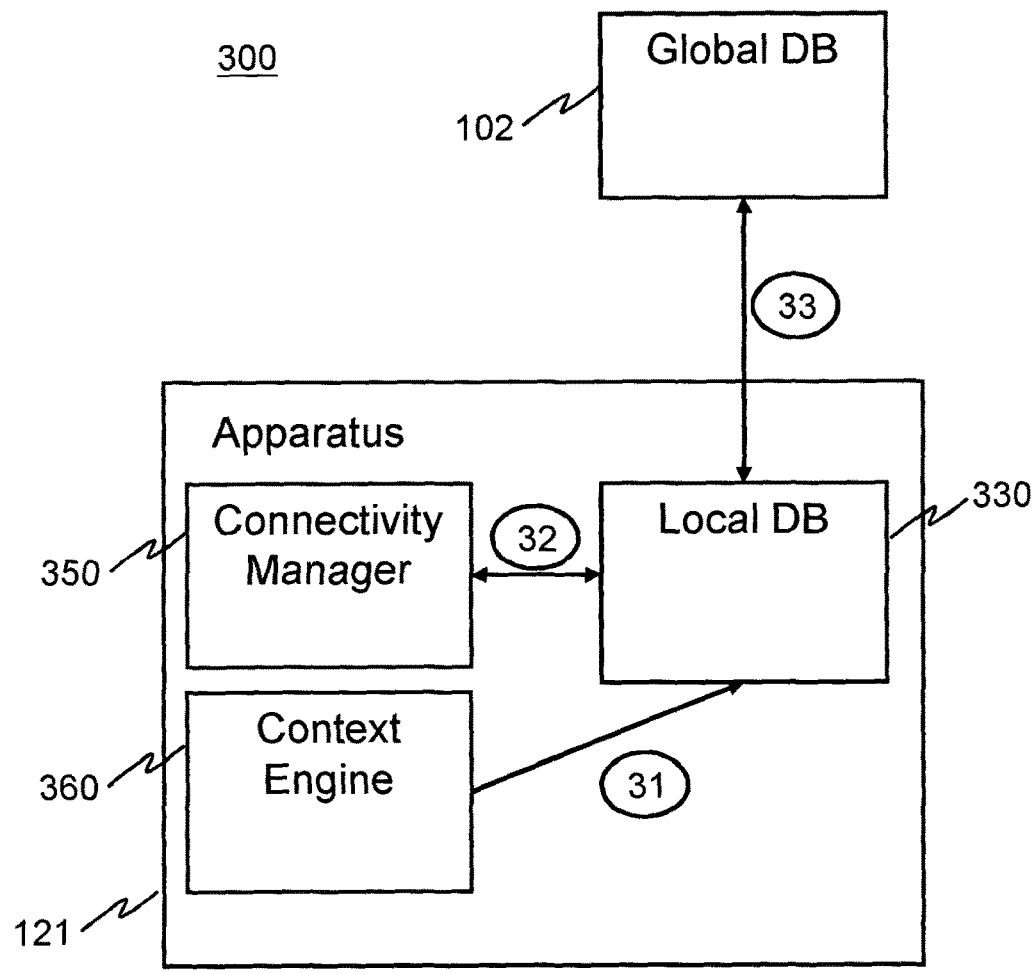
FIG. 3 shows a functional block diagram of a system according to an example embodiment of the invention.

FIG. 3 shows a functional block diagram of a system 300 according to an example embodiment of the invention. The system 300 comprises a global database element 102 and an apparatus or a user device 121.

The global database 102 comprises the access point information relating to various access points. The global database 102 is configured to serve the access point information for example to the apparatus 121 either automatically or as requested by the apparatus 121.

The apparatus 121 comprises a local database element 330, a connectivity manager unit 350, and a context engine unit 360. The local database 330 is configured to securely store access point information. For example, the access point information is stored in encrypted form. Alternatively the access point information is otherwise secured to prevent unauthorized access. In an embodiment, the local database element 330 resides on a trusted platform. The access point information is downloaded to the local database element 330 from the global database 102. In an example embodiment, the local database element 330 comprises access point information from a large geographical region such as a country or a state. Alternatively, the local database element 330 could include all entries of the global database 102, but suitability of this alternative may depend on the amount of entries in the global database 102.

The connectivity manager unit 350 is configured to manage connections to communication networks for example through various access points. For this purpose the connectivity manager unit 350 needs access point information. The connectivity manager unit 350 handles connection creation and manages credentials and other relevant information, for example. In an example embodiment the connectivity manager unit 350 comprises only locally relevant access point information provided from the local database element 330.

The context engine unit 360 is configured to provide contextual information related to the apparatus 121 including but not limited to location, movement, etc. Herein the context engine unit 360 refers to an overall functionality relating to contextual information and may comprise various device parts providing needed contextual information. One example of a context engine unit 360 is comprised in Android™ activity recognition, location and connectivity manager.

In an example embodiment the components shown in FIG. 3. interact with each other as follows:

The connectivity manager unit 350 has only locally relevant access point information in its own data structures. The local database element 330 is configured to add, update and/or remove access point information from the connectivity manager unit 350 when context, such as current location or predicted location of the apparatus 121, changes or upon receiving a request for particular access point information.

The local database element 330 receives context information from the context engine unit 360. Based on this information the local database element 330 is configured to (re)configure the connectivity manager unit 350 and add, update and/or remove access point information. This includes situations where the location of the apparatus 121 is changed, WLAN scanning results arrive etc. With this approach the connectivity manager unit 350 comprises only limited amount of data all the time as most of the (sensitive) information is securely stored in the local database element 330.

In an example embodiment, before actually configuring particular access point information to the connectivity manager unit 350 the local database element 330 checks that the particular access point is reachable by the apparatus 121. That is, the apparatus 121 (e.g. the connectivity manager unit 350 thereof) is configured to scan availability of access networks and the local database element 330 can be configured to check that the scan results include the access point in question before giving out the credentials for that access point. Additionally or alternatively the local database element 330 can be configured to check that the location of the apparatus 121 matches with a location of the access point the apparatus is trying to connect to. In this way security can be improved.

The local database element 330 may request more information from the global database 102 if it is determined that there is need for that (e.g. when geographical boundaries of current dataset are close by or when it is anticipated that the apparatus 121 will move to another country e.g. when the user of the apparatus is travelling). The global database 102 may also send updates and changes to the local database element 330 by itself (i.e. without any request from the apparatus 121). In an example embodiment the global database 102 can send to the apparatus 121 a request to clear the local database element 330 for some reason. In that case the contents of the local database 330 is fully removed from the apparatus 121.

In an example embodiment the connection between the global database 102 and the apparatus 121 is secured so that it is possible to keep the access point information always secured. In an example the access point information is stored in encrypted form in the global database 102. When the access point information is transferred to the apparatus 121, the access point information is first decrypted in the global database 102 and then transferred to the apparatus over a secure connection, e.g. ssl, secure sockets layer, connection, and then the access point information is again encrypted in the local database element 330 of the apparatus 121.

Herein it is noted that in various prior art systems a connectivity manager of a user device comprises all access point information available in the user device. Whereas in an example embodiment of this invention, the connectivity manager comprises only the access point information that is needed thereby making operation of the connectivity manager smooth and improving security of the access point information.

Figure 4:
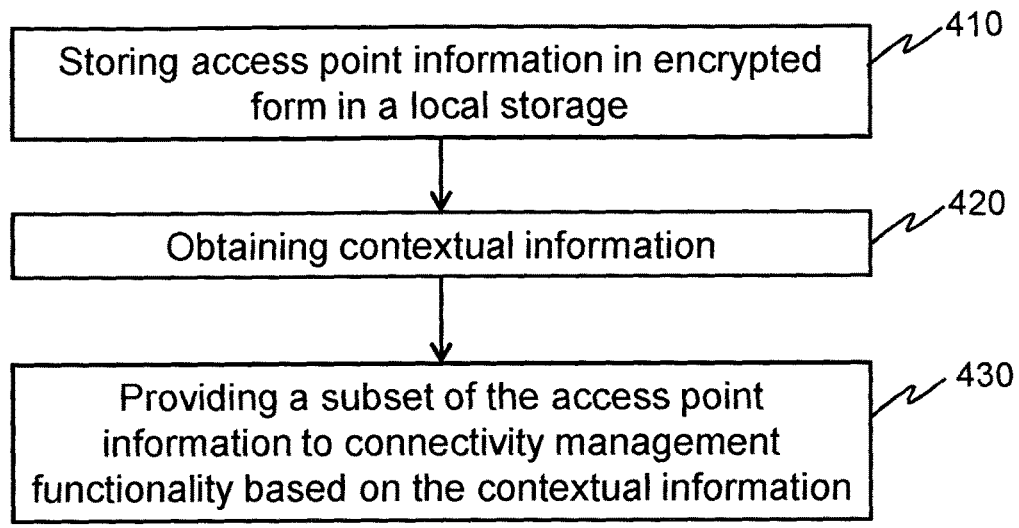
FIG. 4 shows a flow diagram illustrating a method according to an example embodiment of the invention.

FIG. 4 shows a flow diagram illustrating a method according to an example embodiment of the invention. The method is performed in a user device such as a mobile phone, tablet or other handheld device provided with wireless communication functionality.

In phase 410, access point information is stored in encrypted or otherwise secured form in a local storage in the user device. The access point information can be obtained for example from a global database.

In phase 420, contextual information is obtained e.g. from a context engine.

In phase 430, a subset of the access point information stored in the local storage is provided to connectivity management functionality based on the contextual information. That is, it is determined on the basis of the contextual information what access point information is likely needed in connectivity management functionality at present or in near future and that access information is provided to the connectivity management functionality. The information is provided in such form that it is readily usable in the connectivity management functionality, e.g. in unencrypted or in clear form.

Herein it needs to be noted that in an example embodiment the contextual information is not necessarily needed. In some cases the connectivity management functionality might simply ask from the local storage access point information of the access points it currently hears. I.e. the connectivity management functionality might ask from the local storage access point information of the access points to which it can potentially connect to at present.

Figure 5:
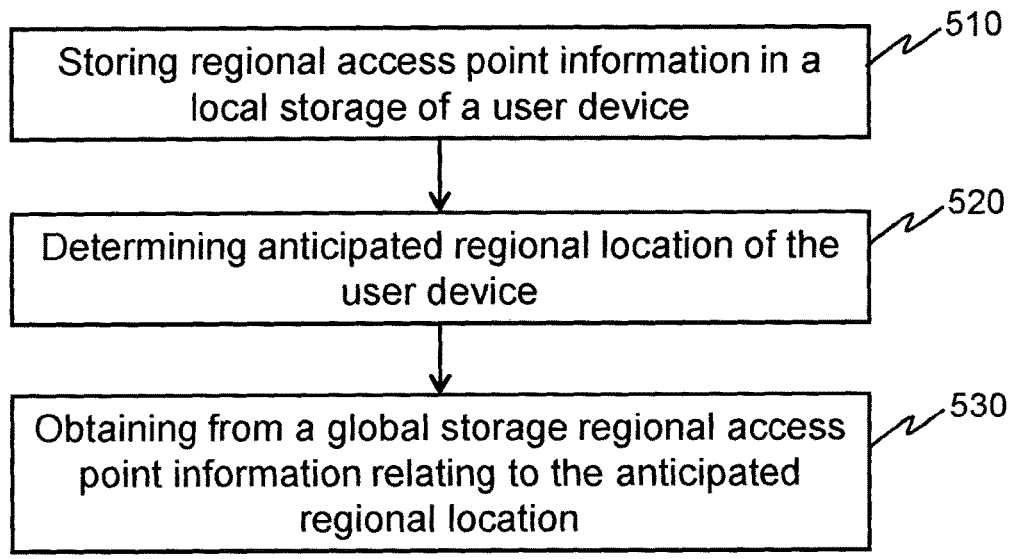
FIG. 5 shows a flow diagram illustrating a method according to an example embodiment of the invention.

FIG. 5 shows a flow diagram illustrating a method according to an example embodiment of the invention. The method is performed in a user device such as a mobile phone, tablet or other handheld device provided with wireless communication functionality.

In phase 510, regional access point information is stored in a local storage in the user device. The regional access point information is obtained form a global database and the regional access point information is a subset of all available access point information available in the global database. The subset may comprise for example access point information relating to all access points in certain geographical region, such as continent, country, county, or city.

In phase 520, an anticipated or predicted regional location of the user device is determined. For example on the basis of a calendar entries of the user of the user device, it can be determined that the user is about to travel to another country. In that case it is determined that user device's regional location will change from the current country.

In phase 530, a global storage is connected to and access point information relating to the anticipated regional location is obtained therefrom. In this way, the user device readily includes access point information needed in a new country (or other region) when the user of the device arrives in the new country. In this way user experience can be improved.

Without in any way limiting the scope, interpretation, or application of the claims appearing below, a technical effect of one or more of the example embodiments disclosed herein is improved security. As access point information is stored in encrypted form in user devices, the access point information is not freely available to potential malicious users. In an example embodiment the access point information is available in clear form only very briefly when the access point information is actually needed for connecting to an access point. Another technical effect of one or more of the example embodiments disclosed herein is improved scalability. As a subset of access point information (the subset possibly consisting for example access point information of one or two access points) is provided to connectivity management only when respective access point information is needed, the connectivity management does not need to handle large set of access point information or to search for the right access point information from a large se of access point information. Another technical effect of one or more of the example embodiments disclosed herein is improved user experience. As connectivity management is provided with necessary access point information based on current context and/or anticipated context transfer from one access point to another can be performed smoothly.

Embodiments of the present invention may be implemented in software, hardware, application logic or a combination of software, hardware and application logic. The software, application logic and/or hardware may reside on the user devices or apparatuses 121-122. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the before-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the foregoing describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   at least one processor; and
   at least one non-transitory computer-readable memory medium comprising computer code, the at least one non-transitory computer-readable memory medium and the computer code configured to, with the at least one processor, cause the apparatus to:
   provide wireless network access;
   store access point information in encrypted form in a local secure storage of a device;
   obtain contextual information relating to the device, wherein the contextual information comprises at least one of: date, time, location of the device, or an anticipated location of the device;
   selectively provide a subset of the access point information from the local secure storage based on the obtained contextual information to the device, wherein to selectively provide the subset of the access point information comprises adding, updating, or removing the access point information when the contextual information changes;
   provide the subset of the access point information in unencrypted form to a connectivity management unit of the device; and
   determine an anticipated regional location of the device and to control the local secure storage to obtain from a global access point information storage regional access point information relating to the anticipated regional location of the device.

2. The apparatus according to claim 1, wherein the at least one non-transitory computer-readable memory medium and the computer code are further configured to, with the at least one processor, cause the apparatus to provide the subset of the access point information to a connectivity management unit of the device based on connectivity requirements of the device.

3. The apparatus according to claim 2, wherein the at least one non-transitory computer-readable memory medium and the computer code are further configured to, with the at least one processor, cause the apparatus to provide the subset of the access point information to the connectivity management unit of the device so that the connectivity management unit is provided with access point information that is needed in the connectivity management unit at each time.

4. The apparatus according to claim 2, wherein the at least one non-transitory computer-readable memory medium and the computer code are further configured to, with the at least one processor, cause the apparatus to:
   receive from the connectivity management unit a request for certain access point information; and
   control the local secure storage to provide to the connectivity management unit the requested access point information.

5. The apparatus according to claim 4, wherein the at least one non-transitory computer-readable memory medium and the computer code are further configured to, with the at least one processor, cause the apparatus to:
   scan availability of access networks; and
   check whether results from the scan include an access point associated with the requested access point information before providing the requested access point information.

6. The apparatus according to claim 1, wherein the access point information comprises at least one of the following: mac address, ssid, credentials, or location of the respective access point.

7. The apparatus according to claim 1, wherein the local secure storage resides on a trusted platform.

8. The apparatus according to claim 7, wherein the at least one non-transitory computer-readable memory medium and the computer code are further configured to, with the at least one processor, cause the apparatus to obtain the access point information from a global access point information storage.

9. The apparatus according to claim 8, wherein the obtained access point information from the global access point information storage comprises a subset of all available access point information available in a global database, the subset of all available access point information comprising access point information relating to all access points in a certain geographical region, continent, country, county or city.

10. The apparatus according to claim 1, wherein said subset comprises access point information of one access point.

11. The apparatus according to claim 1, wherein said subset comprises access point information of at least one access point.

12. The apparatus according to claim 1, wherein the anticipated regional location of the device is based on calendar application entries of the device.

13. A method, comprising:
providing wireless network access;
securely storing access point information in encrypted form in a local secure storage of a device;
obtaining contextual information relating to the device, wherein the contextual information comprises at least one of: date, time, location of the device, or an anticipated location of the device;
selectively providing a subset of the access point information from the local secure storage based on the obtained contextual information, wherein selectively providing the subset of the access point information comprises adding, updating, or removing the access point information when the contextual information changes;
providing the subset of the access point information in unencrypted form to a connectivity management unit of the device; and
determining an anticipated regional location of the device and to control the local secure storage to obtain from a global access point information storage regional access point information relating to the anticipated regional location of the device.

14. The method according to claim 13, further comprising providing the subset of the access point information to the connectivity management unit of the device based on connectivity requirements of the device.

15. The method according to claim 13, further comprising providing the subset of the access point information to the connectivity management unit of the device so that the connectivity management unit is provided with access point information that is needed in the connectivity management unit at each time.

16. The method according to claim 13, further comprising
receiving a request for certain access point information; and
providing to the connectivity management functionality the requested access point information.

17. A computer program product comprising a non-transitory computer-readable medium encoded with instructions that, when executed by a processor, cause an apparatus to perform:
providing wireless network access;
securely storing access point information in encrypted form in a local secure storage of a device;
obtaining contextual information relating to the device, wherein the contextual information comprises at least one of: date, time, location of the device, or an anticipated location of the device;
selectively providing a subset of the access point information from the local secure storage based on the obtained contextual information, wherein selectively providing the subset of the access point information comprises adding, updating, or removing the access point information when the contextual information changes;
providing the subset of the access point information in unencrypted form to a connectivity management unit of the device; and
determining an anticipated regional location of the device and to control the local secure storage to obtain from a global access point information storage regional access point information relating to the anticipated regional location of the device.

* * * * *